(12) United States Patent
Yang

(10) Patent No.: US 6,318,964 B1
(45) Date of Patent: Nov. 20, 2001

(54) COMPLEX COOLING FAN WITH INCREASED COOLING CAPACITY

(76) Inventor: Sheng Shyan Yang, PO Box 82-144, Taipei (TW)

( * ) Notice: Subject to any disclaimer, the term of this patent is extended or adjusted under 35 U.S.C. 154(b) by 0 days.

(21) Appl. No.: 09/657,600

(22) Filed: Sep. 8, 2000

(51) Int. Cl.$^7$ ..................................................... F04D 29/38
(52) U.S. Cl. ..................... 416/185; 416/187; 416/204 R; 416/207; 416/214 A; 415/198.1
(58) Field of Search ................................. 416/179, 182, 416/185, 187, 188, 204 R, 207–209, 214 A; 415/198.1

(56) References Cited

U.S. PATENT DOCUMENTS 5,741,118 * 4/1998 Shinbara et al. ................. 416/186 R

FOREIGN PATENT DOCUMENTS 58-195099-A * 11/1983 (JP) ...................................... 416/185
6-270893-A * 9/1994 (JP) ................................... 416/204 R

* cited by examiner

*Primary Examiner*—Jiping Lu
(74) *Attorney, Agent, or Firm*—Rosenberg, Klein & Lee

(57) ABSTRACT

A complex cooling fan includes an upper fan including an upper fan and a lower fan, the upper fan including a first cylindrical body, a plurality of first blades extending outwardly from the cylindrical shell body, and a cylindrical collar extending downwardly from the first cylindrical shell body, the cylindrical collar having a smaller diameter than the first cylindrical shell body, a lower edge of the first cylindrical shell body being formed with a positioning notch, and a lower fan including a second cylindrical shell body and a plurality of second blades extending outwardly from the second cylindrical shell body, the second cylindrical shell body having same outer diameter as the first cylindrical shell body and having an upper edge formed with a protuberance configured to engage with the positioning notch of the first cylindrical shell body, an inner diameter of the second cylindrical shell body having same size as an outer diameter of the cylindrical collar, the cylindrical collar being fitted into the second cylindrical shell body with the positioning notch engaged with the protuberance and the first blades aligned with second thereby combining the upper and lower fans together, whereby the complex cooling fan has increased cooling capacity and the molds for manufacturing the fan can be prolonged in service life thereby reducing the manufacturing cost.

1 Claim, 4 Drawing Sheets

COMPLEX COOLING FAN WITH INCREASED COOLING CAPACITY

BACKGROUND OF THE INVENTION (a) Technical Field of the Invention

This invention is related to a complex cooling fan and in particular to one which has increased cooling capacity and can be manufactured at a low cost.

(b) Description of the Prior Art

There are two ways to increase the cooling capacity of a cooling fan, i.e. increasing the area of the blade and forming an air passage between two adjacent blades. However; in order to enable the conventional cooling fan to be released from the injection molds, there must be a distance between the vertical projection of the upper point of a blade of a conventional cooling fan between the vertical projection of the lower point of an adjacent blade of the conventional cooling fan thereby making it impossible to form an air passage between two adjacent blades and therefore rendering it difficult to increase its cooling capacity. Hence, it has been proposed to make the vertical projection of the upper point of a blade coincide with the vertical projection of a lower point of an adjacent blade so that the molds must be formed with sharp angles in order to achieve this purpose thus making the molds easily damaged in working and transportation. As shown in FIG. 1, the conventional cooling fan 1 has a body 11 on which there are a plurality of blades 12, wherein the vertical projection of the upper point 12a of a blade is coincide with the vertical projection of the lower point 12b of an adjacent blade. Hence, there will be a first acute angle 14 between the mold releasing line 13 and the upper point 12a and a second acute angle 15 between the mold releasing line 13 and the lower point 12b. Accordingly, there will be a sharp angle A3 between the male mold A1 and the female mold A2 (see FIG. 2), thereby making the molds be easily damaged.

Therefore, it is an object of the present invention to provide an improvement in the structure of a cooling fan which can obviate and mitigate the above-mentioned drawbacks.

SUMMARY OF THE INVENTION

This invention is related to a complex cooling fan.

It is the primary object of the present invention to provide a complex cooling fan which is composed of a plurality of fans thereby enabling it to have more blades than the conventional cooling fan and forming an air guiding passage between two adjacent blades for increasing the cooling capacity.

It is another object of the present invention to provide a complex cooling fan which can be manufactured by molds without sharp angles thus preventing the molds from damage in working or transportation and therefore reducing the manufacturing costs.

According to a preferred embodiment of the present invention, a complex cooling fan includes an upper fan including an upper fan and a lower fan, the upper fan including a first cylindrical body, a plurality of first blades extending outwardly from the cylindrical shell body, and a cylindrical collar extending downwardly from the first cylindrical shell body, the cylindrical collar having a smaller diameter than the first cylindrical shell body, a lower edge of the first cylindrical shell body being formed with a positioning notch, and a lower fan including a second cylindrical shell body and a plurality of second blades extending outwardly from the second cylindrical shell body, the second cylindrical shell body having same outer diameter as the first cylindrical shell body and having an upper edge formed with a protuberance configured to engage with the positioning notch of the first cylindrical shell body, an inner diameter of the second cylindrical shell body having same size as an outer diameter of the cylindrical collar, the cylindrical collar being fitted into the second cylindrical shell body with the positioning notch engaged with the protuberance and the first blades aligned with second thereby combining the upper and lower fans together, whereby the complex cooling fan has increased cooling capacity and the molds for manufacturing the fan can be prolonged in service life thereby reducing the manufacturing cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
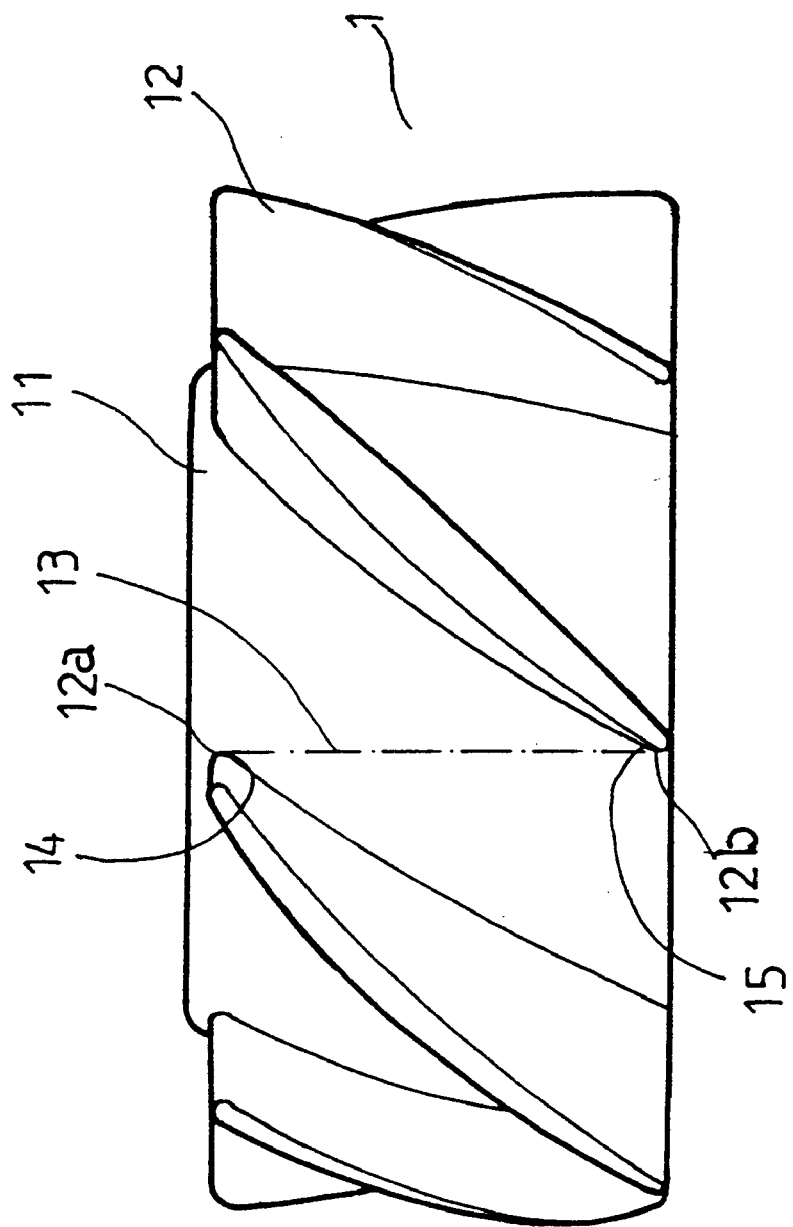
FIG. 1 is a front view of a prior art cooling fan.
Figure 2:
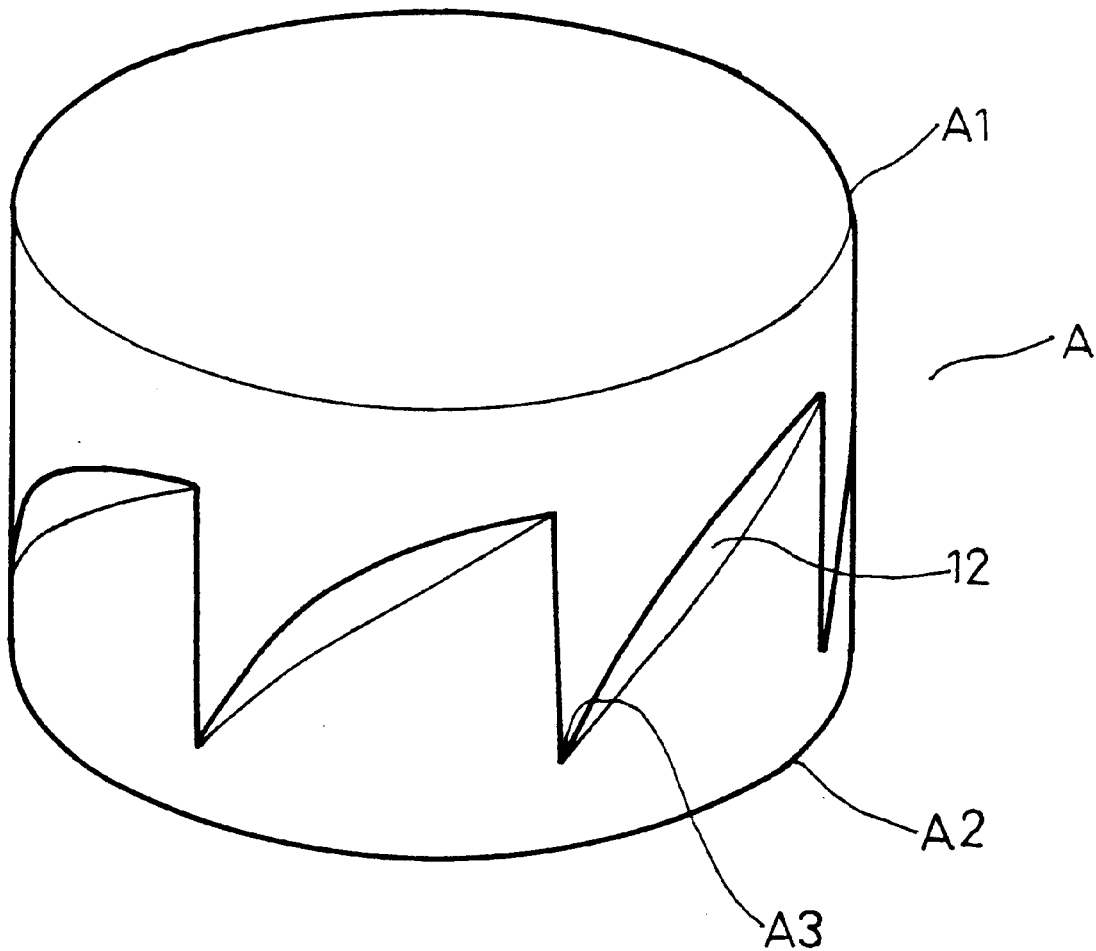
FIG. 2 is a perspective view of a mold for manufacturing the prior art cooling fan.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 4:
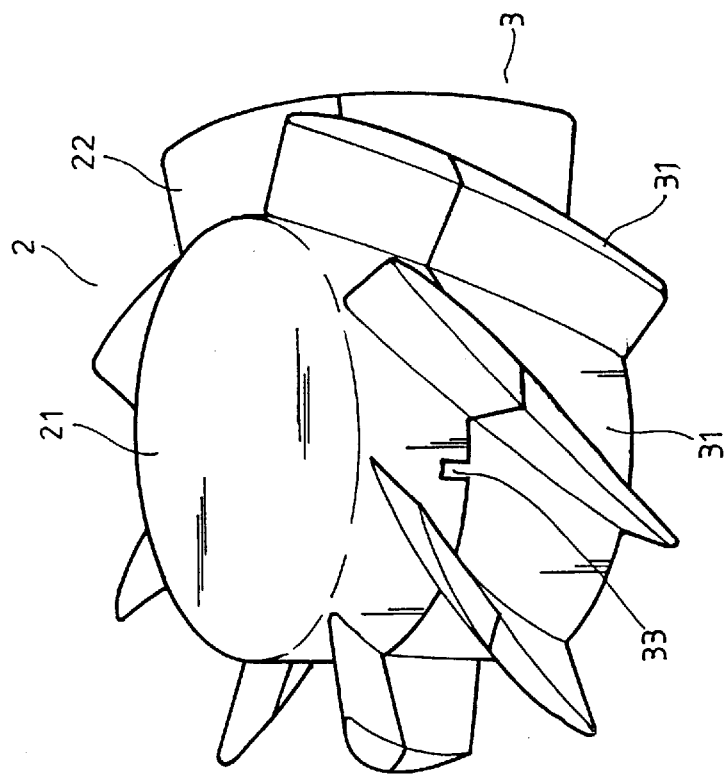
FIG. 4 is a perspective view of the cooling fan according to the present invention.
Figure 3:
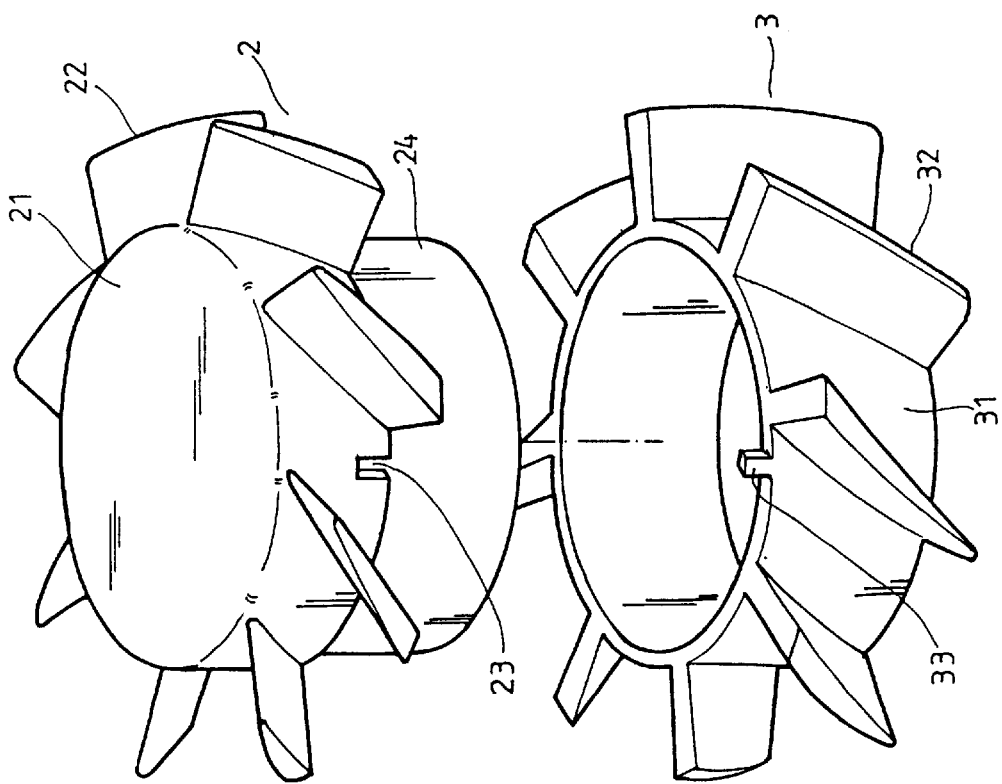
FIG. 3 is an exploded view of a cooling fan according to the present invention.
Figure 6:
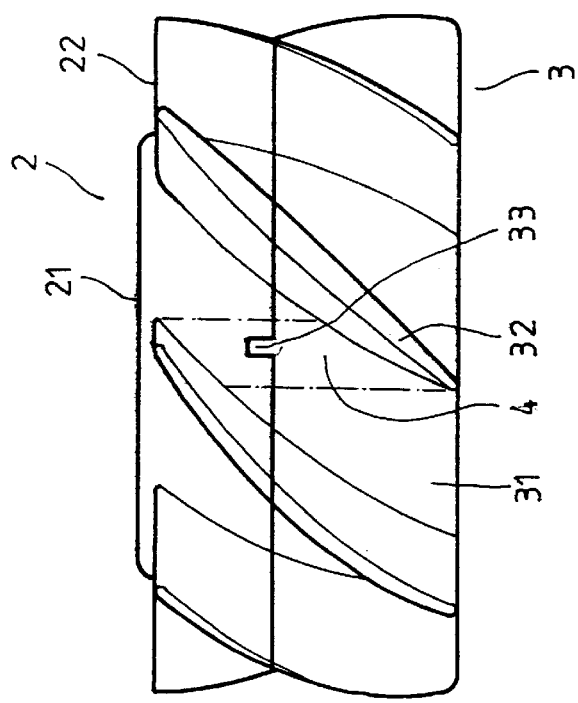
FIG. 6 is an assembly view of the preferred embodiment according to the present invention.

With reference to the drawings and in particular to FIGS. 3 and 4 thereof, the complex cooling fan according to the present invention generally comprises an upper fan 2 and a lower fan 3. The upper fan 2 includes a cylindrical body 21, a plurality of blades 22 extending outwardly from the cylindrical shell body 21, and a cylindrical collar 24 extending downwardly from the cylindrical shell body 21. The cylindrical collar 24 has a smaller diameter than the cylindrical shell body 21. The lower edge of the cylindrical shell body 21 is formed with a positioning notch 23.

The lower fan 3 includes a cylindrical shell body 31 and a plurality of blades 32 extending outwardly from the cylindrical shell body 31. The cylindrical shell body 31 has the same outer diameter as the cylindrical shell body 21 and has an upper edge formed with a protuberance 33 configured to engage with the positioning notch 23 of the cylindrical shell body 21. The inner diameter of the cylindrical shell body 31 has the same size as the outer diameter of the cylindrical collar 24 so that the cylindrical collar 24 can be fitted into the cylindrical shell body 31 with the positioning notch 23 engaged with the protuberance 33 and the blades 22 aligned with the blades 32 thereby combining the upper and lower fans 2 and 3 together.

When in assembly, the outer surface of the cylindrical collar 24 is fist coated with a layer of strong adhesive agent and then the cylindrical collar 24 is fitted into the cylindrical shell body 31 with the positioning notch 23 of the former engaged with the protuberance 33 of the latter and the blades 22 of the former aligned with the blades 32 of the latter thereby combining the upper and lower fans 2 and 3 together. However, it should be noted that the upper fan 2 and the lower fan 3 can be combined together by high frequency heating without the use of any adhesive agent.

Figure 5:
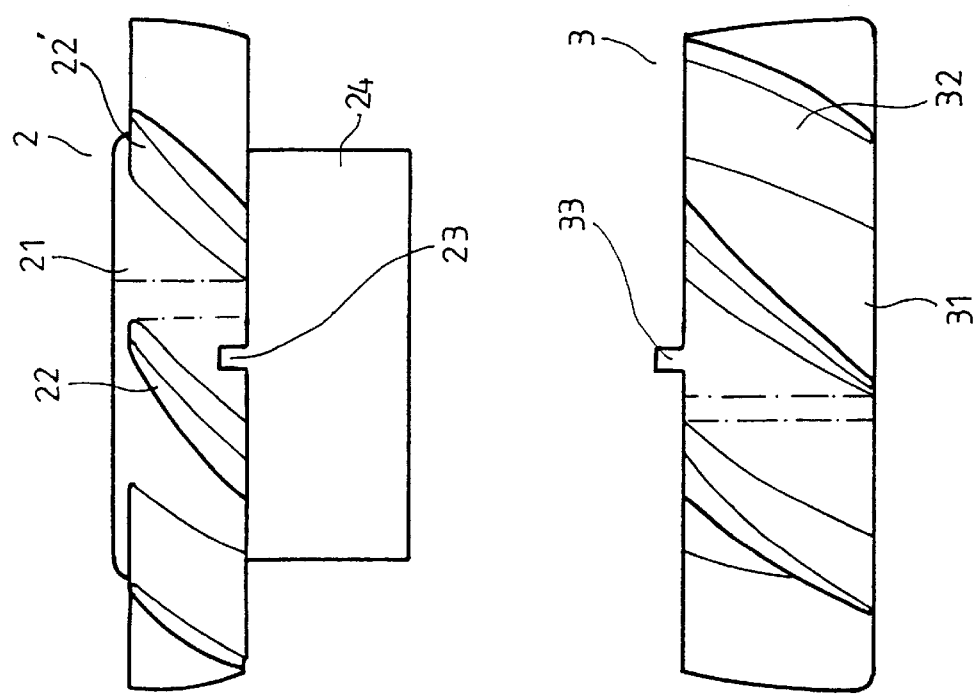
FIG. 5 is an exploded view of a preferred embodiment according to the present invention.

Referring to FIG. 5, the present invention is composed of the upper fan 2 and the lower fan 3. As the upper fan 2 is not engaged with the lower fan 3, there will be a distance (shown by a gap between two dotted lines) between two adjacent blades 22 and 22' of the upper fan 2 and between two adjacent blades of the lower fan 3, the connection between the upper mold (not shown) and the lower mold (not shown) can be set at the intermediate position of the gap so that the upper and lower molds do not have sharp angles thereby preventing the molds from damage caused by impact in working or transportation and therefore extending the service life of the molds and reducing the manufacturing costs of the fans. As the upper fan 2 is engaged with the lower fan 3, the blades 22 of the former will be aligned with the blades 32 of the latter and there will be no gap between two adjacent blades thereby enabling the present invention to have more blades than the conventional cooling fan and forming an air guiding passage 4 between two adjacent blades and therefore increasing the cooling capacity.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A composite cooling fan comprising:

(a) a first fan portion including:
 (1) a first cylindrical shell body, said first cylindrical shell body defining a first peripheral edge having a positioning notch formed therein;
 (2) a plurality of first blades extending radially outward from said first cylindrical shell body; and,
 (3) a cylindrical collar extending axially from said first cylindrical shell body, said cylindrical collar being in diametric dimension less than said first cylindrical shell body; and, (b) a second fan portion coaxially coupled to said first fan portion, said second fan portion including:
 (1) a second cylindrical shell body coaxially receiving said cylindrical collar of said first fan portion in frictionally engaged manner, said second cylindrical shell body being in outer diametric dimension substantially equivalent to said first cylindrical shell body of said first fan portion, said second cylindrical shell body defining a second peripheral edge formed with a protuberance engaging said positioning notch of said first peripheral edge of said first cylindrical shell body; and,
 (2) a plurality of second blades extending radially outward from said second cylindrical shell body, said second blades respectively engaging in aligned manner said first blades to define a plurality of combined blades, adjacent ones of said combined blades being disposed to at least partially project one over the other, and being spaced one from the other by a guiding passage extending therebetween.

* * * * *